US012040561B2

(12) United States Patent
Wang et al.

(10) Patent No.: US 12,040,561 B2
(45) Date of Patent: Jul. 16, 2024

(54) ANTENNA MODULE

(71) Applicant: PEGATRON CORPORATION, Taipei (TW)

(72) Inventors: Tse-Hsuan Wang, Taipei (TW); Chien-Yi Wu, Taipei (TW); Chih-Fu Chang, Taipei (TW); Chao-Hsu Wu, Taipei (TW); Chih-Yi Chiu, Taipei (TW); Wei-Han Yen, Taipei (TW); Tsung-Chi Tsai, Taipei (TW); Shih-Keng Huang, Taipei (TW); I-Shu Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 136 days.

(21) Appl. No.: 17/967,664

(22) Filed: Oct. 17, 2022

(65) Prior Publication Data

US 2023/0163467 A1 May 25, 2023

(30) Foreign Application Priority Data

Nov. 23, 2021 (TW) ................................ 110143604

(51) Int. Cl.
*H01Q 21/06* (2006.01)
*H01Q 5/371* (2015.01)
*H01Q 13/20* (2006.01)

(52) U.S. Cl.
CPC .......... *H01Q 5/371* (2015.01); *H01Q 13/206* (2013.01)

(58) Field of Classification Search
CPC ............................ H01Q 5/371; H01Q 13/206
See application file for complete search history.

(56) References Cited

U.S. PATENT DOCUMENTS

2012/0293384 A1* 11/2012 Knudsen .............. H01Q 19/005 343/745
2014/0097986 A1 4/2014 Xue et al.

FOREIGN PATENT DOCUMENTS

TW I711220 11/2020

* cited by examiner

*Primary Examiner* — Henry Luong
(74) *Attorney, Agent, or Firm* — J.C. PATENTS

(57) ABSTRACT

An antenna module includes a transceiver chip, a transmitting array antenna, a receiving array antenna, two bandpass filters, and two capacitors. The transmitting array antenna and the receiving array antenna are symmetrically disposed at the two opposite sides of the transceiver chip. One of the bandpass filters is disposed between the transceiver chip and the transmitting array antenna and connected to the transceiver chip and the transmitting array antenna. The other bandpass filter is disposed between the transceiver chip and the receiving array antenna and connected to the transceiver chip and the receiving array antenna. One of the capacitors is disposed between the transmitting array antenna and the corresponding bandpass filter and connected to the transmitting array antenna and the corresponding bandpass filter. The other capacitor is disposed between the receiving array antenna and the corresponding bandpass filter and connected to the receiving array antenna and the corresponding bandpass filter.

10 Claims, 5 Drawing Sheets

ANTENNA MODULE

CROSS-REFERENCE TO RELATED APPLICATION

This application claims the priority benefit of Taiwan application serial no. 110143604, filed on Nov. 23, 2021. The entirety of the above-mentioned patent application is hereby incorporated by reference herein and made a part of this specification.

BACKGROUND

Technology Field

The disclosure relates to an antenna module, and more particularly, to an antenna module having good antenna performance.

Description of Related Art

The frequency range of the antenna used for radar detection has, for example, a narrow bandwidth in 24 GHz (24.05 GHz to 24.25 GHz). How to provide such an antenna with good performance is a research direction in the art.

SUMMARY

The disclosure provides an antenna module having good antenna performance.

An antenna module of the disclosure includes a transceiver chip, a transmitting array antenna, a receiving array antenna, two bandpass filters, and two capacitors. The transmitting array antenna and the receiving array antenna are symmetrically disposed at two opposite sides of the transceiver chip. One of the two bandpass filters is disposed between the transceiver chip and the transmitting array antenna and is connected to the transceiver chip and the transmitting array antenna. The other bandpass filter is disposed between the transceiver chip and the receiving array antenna and is connected to the transceiver chip and the receiving array antenna. One of the two capacitors is disposed between the transmitting array antenna and the corresponding bandpass filter and is connected to the transmitting array antenna and the corresponding bandpass filter. The other capacitor is disposed between the receiving array antenna and the corresponding bandpass filter and is connected to the receiving array antenna and the corresponding bandpass filter.

In an embodiment of the disclosure, the antenna module further includes a power divider disposed between the transceiver chip and the bandpass filter corresponding to the transmitting array antenna, and is connected to the transceiver chip and the corresponding bandpass filter.

In an embodiment of the disclosure, the antenna module further includes a first impedance transformer, a second impedance transformer, a first microstrip, and a second microstrip, wherein the first impedance transformer, the second impedance transformer, the first microstrip, and the second microstrip are disposed between the transceiver chip and the power divider, the first impedance transformer is connected to the transceiver chip, the first microstrip is connected to the first impedance transformer and the power divider, the second impedance transformer is connected to the transceiver chip, the second microstrip is connected to the second impedance transformer and the power divider, and a length of the first microstrip is different from a length of the second microstrip.

In an embodiment of the disclosure, the antenna module further includes a third impedance transformer and a third microstrip, wherein the third impedance transformer and the third microstrip are disposed between the transceiver chip and the bandpass filter corresponding to the receiving array antenna, the third impedance transformer is connected to the transceiver chip, and the third microstrip is connected to the third impedance transformer and the corresponding bandpass filter.

In an embodiment of the disclosure, the antenna module further includes two transmission lines, wherein one of the two transmission lines is connected to the transmitting array antenna and the corresponding bandpass filter, the other transmission line is connected to the receiving array antenna and the corresponding bandpass filter, the two capacitors are connected to the two respective transmission lines, each of the capacitors includes a first line segment connected to the corresponding transmission line, the antenna module resonates at a frequency band, and a length of the first line segment is ¼ wavelength of the frequency band.

In an embodiment of the disclosure, each of the capacitors further includes a second line segment connected to the first line segment, and a length of the second line segment is ¼ wavelength of the frequency band.

In an embodiment of the disclosure, each of the capacitors further includes a sector-shaped block connected to the first line segment.

In an embodiment of the disclosure, each of the transmitting array antenna and the receiving array antenna includes a main line, a plurality of symmetric branch lines extending from the main line, and a plurality of patch units connected to the branch lines, the patch units are arranged in a form of an array, the antenna module resonates at a frequency band, and a length of the main line is a wavelength of the frequency band.

In an embodiment of the disclosure, the patch units include feeding ends connected to the branch lines, and a distance between two adjacent feeding ends is between 0.5 to 0.7 wavelength of the frequency band.

In an embodiment of the disclosure, the antenna module further includes a plurality of fourth impedance transformers disposed at intersections of the main line and the branch lines.

Based on the above, the transmitting array antenna and the receiving array antenna of the antenna module of the disclosure are symmetrically arranged at the two opposite sides of the transceiver chip, and the design of separating the transmitting array antenna and the receiving array antenna may improve antenna efficiency. In addition, a bandpass filter is disposed between the transceiver chip and the transmitting array antenna, and another bandpass filter is disposed between the transceiver chip and the receiving array antenna. The installation of the bandpass filters may prevent the electromagnetic interference (EMI) on the transmitting array antenna, and the bandpass filters filter out unwanted frequencies for the receiving array antenna. Moreover, a capacitor is provided between the transmitting array antenna and the corresponding bandpass filter, and another capacitor is provided between the receiving array antenna and the corresponding bandpass filter. This design avoids electrostatic discharge (ESD), thus preventing excessive static electricity from damaging the transceiver chip. Furthermore, the antenna module of the disclosure has better impedance matching with the above design.

DESCRIPTION OF THE EMBODIMENTS

Figure 1:
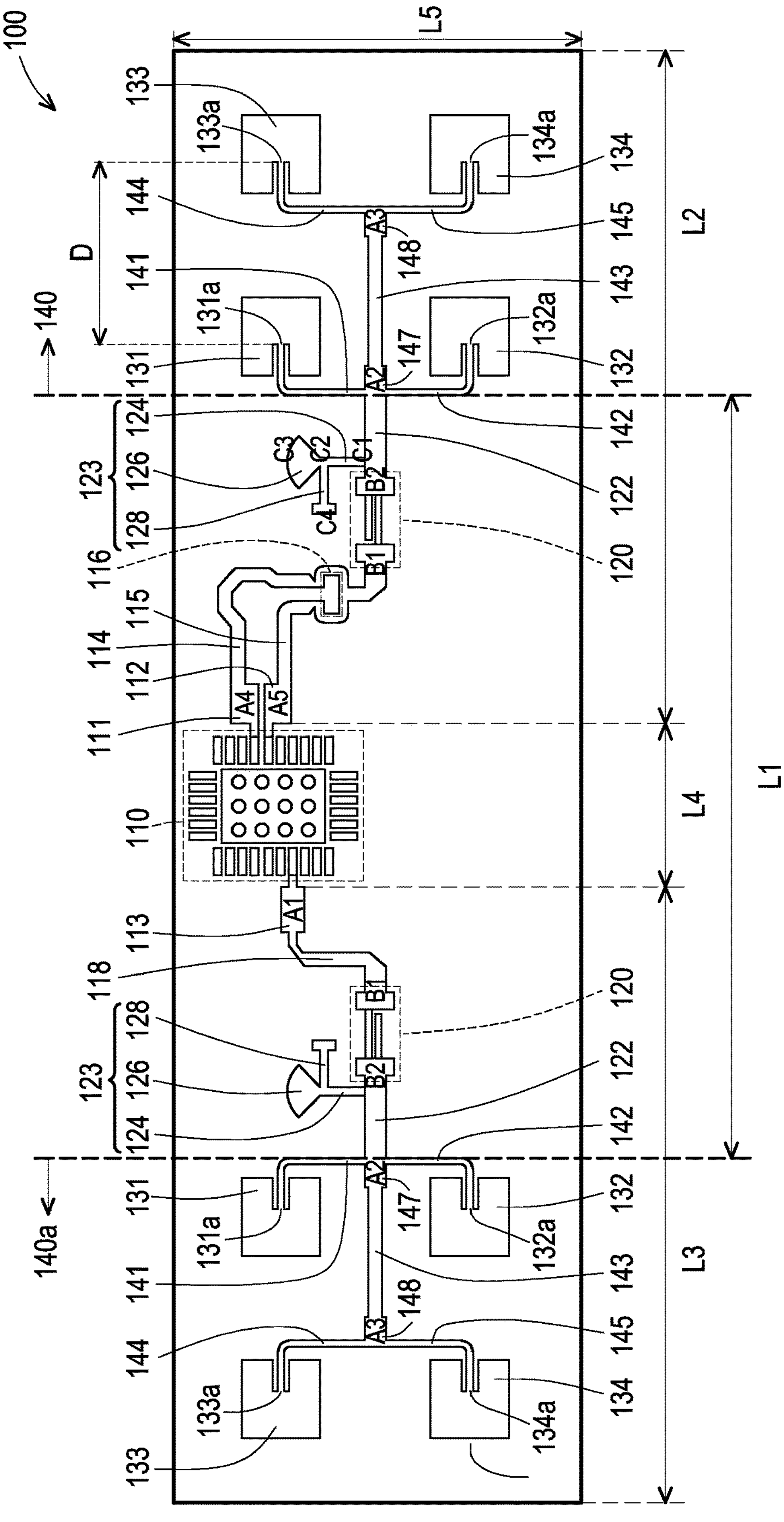
FIG. 1 is a schematic diagram of an antenna module according to an embodiment of the disclosure.

FIG. 1 is a schematic diagram of an antenna module according to an embodiment of the disclosure. Referring to FIG. 1, an antenna module 100 of the present embodiment includes a transceiver chip 110, a transmitting array antenna 140, a receiving array antenna 140*a*, two bandpass filters 120, and two capacitors 123. The antenna module 100 may be used as a radar to detect and transmit signals at the same time. In the present embodiment, the antenna module 100 is a millimeter wave antenna with a central frequency point at 24 GHz, and the transceiver chip 110 is a 24 GHz transceiver single-chip, microwave integrated circuit (transceiver MMIC), but the type of the transceiver chip 110 and the antenna frequency band are not limited thereto.

Since the transmitting end and the receiving end of the antenna module 100 perform wireless transmission at the same frequency at the same time, in the present embodiment, the transmitting end and the receiving end are divided into two portions. That is, the transmitting array antenna 140 and the receiving array antenna 140*a* may have better performance. FIG. 1 shows the transmitting array antenna 140 and the receiving array antenna 140*a* are symmetrically disposed at the two opposite sides of the chip 110.

A distance L1 between the transmitting array antenna 140 and the receiving array antenna 140*a* is about 30 mm. A distance L2 from the transceiver chip 110 to the right end of the circuit board installed in the antenna module 100 is about 27 mm. A distance L3 from the transceiver chip 110 to the left end of the circuit board installed in the antenna module 100 is about 24 mm. A width L4 of the transceiver chip 110 is about 6.5 mm. The length of the circuit board is about 57.5 mm, and a width L5 of the circuit board is about 16 mm.

One of the two bandpass filters 120 (the bandpass filter 120 on the right of FIG. 1) is disposed between the transceiver chip 110 and the transmitting array antenna 140 and is connected to the transceiver chip 110 and the transmitting array antenna 140. The transmitting array antenna 140 is connected with the bandpass filter 120 in series to prevent the electrostatic interference (EMI).

The other bandpass filter 120 (the bandpass filter 120 on the left of FIG. 1) is disposed between the transceiver chip 110 and the receiving array antenna 140*a* and is connected to the transceiver chip 110 and the receiving array antenna 140*a*. The receiving array antenna 140*a* is connected with the bandpass filter 120 in series, and may filter out unwanted frequencies.

In the present embodiment, the bandpass filter 120 is, for example, a combination of two capacitors at positions B1 and B2 and an inductance between the positions B1 and B2. These two capacitors may be grounded. Of course, the type of the bandpass filter 120 is not limited thereto.

Moreover, in the present embodiment, the antenna module 100 further includes a power divider 116 disposed between the transceiver chip 110 and the bandpass filter 120 (the bandpass filter 120 on the right in FIG. 1) corresponding to the transmitting array antenna 140, and the power divider 116 is connected to the transceiver chip 110 and the bandpass filter 120. The power divider 116 is, for example, a Wilkinson power divider 116, but the type of the power divider 116 is not limited thereto.

The antenna module 100 further includes a first impedance transformer 111, a second impedance transformer 112, a first microstrip 114, and a second microstrip 115. The first impedance transformer 111, the second impedance transformer 112, the first microstrip 114, and the second microstrip 115 are disposed between the transceiver chip 110 and the power divider 116.

Specifically, the first impedance transformer 111 and the second impedance transformer 112 are disposed at positions A4 and A5. The first impedance transformer 111 is connected to the transceiver chip 110, and the first microstrip 114 is connected to the first impedance transformer 111 and the power divider 116. The second impedance transformer 112 is connected to the transceiver chip 110, and the second microstrip 115 is connected to the second impedance transformer 112 and the power divider 116.

In the present embodiment, the length of the first microstrip 114 is different from the length of the second microstrip 115. In the present embodiment, the length of the first microstrip 114 is slightly longer than the length of the second microstrip 115 to compensate the phase difference. In addition, the transmitting end of the transceiver chip 110 is differential, so the first impedance transformer 111 and the second impedance transformer 112 located at the positions A4 and A5 are connected to the Wilkinson power divider 116. The power divider 116 converts the signals transmitted by the first microstrip 114 and the second microstrip 115 to be in the same phase.

In addition, the antenna module 100 further includes a third impedance transformer 113 and a third microstrip 118. The third impedance transformer 113 and the third microstrip 118 are disposed between the transceiver chip 110 and the bandpass filter 120 corresponding to the receiving array antenna 140*a*. Specifically, the third impedance transformer 113 is disposed at the position A1. The third impedance transformer 113 is connected to the transceiver chip 110, and the third microstrip 118 is connected to the third impedance transformer 113 and the bandpass 120.

In the present embodiment, the path among the first impedance transformer 111, the second impedance transformer 112, and the corresponding bandpass filter 120 meets the impedance matching of 50 ohms. The path between the third impedance transformer 113 and the corresponding bandpass filter 120 meets the impedance matching of 50 ohms.

It should be mentioned that since the transceiver chip 110 transmits signals to the transmitting array antenna 140 via the first microstrip 114 and the second microstrip 115, the power divider 116 is disposed between the transceiver chip 110 and the bandpass filter 120 corresponding to the transmitting array antenna 140 to obtain the signals in the same phase. On the other hand, since the signals is transmitted via a single third microstrip 118 between the transceiver chip 110 and the receiving array antenna 140*a*, the power divider 116 is not needed.

In addition to the above differences, the configuration of components from the bandpass filter 120 to the transmitting array antenna 140 is the same as the configuration of components from the bandpass filter 120 to the receiving array antenna 140*a*.

Specifically, the antenna module 100 further includes two transmission lines 122. One of the two transmission lines 122 (the transmission line 122 on the right) is connected to the transmitting array antenna 140 and the corresponding bandpass filter 120. The other transmission line 122 (the transmission line 122 on the left) is connected to the receiving array antenna 140 and the corresponding bandpass filter 120.

One of the two capacitors 123 (the capacitor 123 on the right) is disposed between the transmitting array antenna 140 and the corresponding bandpass filter 120 (the bandpass filter 120 on the right) and is connected to the transmission line 122 (the transmission line 122 on the right) between the transmitting array antenna 140 and the corresponding bandpass filter 120. The length of each of the transmission lines 122 may meet the impedance matching of 50 ohms.

The other capacitor 123 (the capacitor 123 on the left) is disposed between the receiving array antenna 140*a* and the corresponding bandpass filter 120 (the bandpass filter 120 on the left) and is connected to the transmission line 122 (the transmission line 122 on the left) between the receiving array antenna 140 and the corresponding bandpass filter 120.

The installation of the capacitor 123 may avoid electrostatic discharge (ESD) and prevent excessive electrostatic current from passing through the transmitting array antenna 140 or the receiving array antenna 140*a* to damage the transceiver chip 110.

In the present embodiment, each of the capacitors 123 includes a first line segment 124 (at positions C1 and C2) connected to the corresponding transmission line 122, a second line segment 128 (at positions C2 and C4) connected to the first line segment 124 by bending, and a sector-shaped block 126 (at positions C2 and C3) connected to the first line segment 124. The antenna module 100 resonates at a frequency band, the length of the first line segment 124 is ¼ wavelength of the frequency band, and the length of the second line segment 128 is ¼ wavelength of the frequency band, so as to have better impedance matching.

In the present embodiment, the antenna module 100 is a millimeter-wave antenna and has higher frequency. Therefore, through the adjustments of the first impedance transformer 111, the third impedance transformer 113, the two bandpass filters 120, and the two sector-shaped capacitors 123, better impedance matching between the transceiver chip 110 and the transmitting array antenna 140 and the receiving array antenna 140*a* may be achieved.

Moreover, each of the transmitting array antenna 140 and the receiving array antenna 140*a* includes a main line 143, a plurality of symmetric branch lines 141, 142, 144, and 145 extending from the main line 143, and a plurality of patch units 131, 132, 133, and 134 connected to these branch lines 141, 142, 144, and 145.

These patch units 131, 132, 133, and 134 are arranged in an array. In the present embodiment, each of the transmitting array antenna 140 and the receiving array antenna 140*a* has four patch units 131, 132, 133, and 134 presented in a 2×2 array. However, the number of the patch units 131, 132, 133, and 134 and the dimension of the matrix are not limited thereto. The length and width of the patch units 131, 132, 133, and 134 are about 3.1 mm and 3.1 mm, but not limited thereto.

The length of the main line 143 (positions A2 and A3) is a wavelength of the frequency band at which the antenna module 100 resonates, and may meet the impedance matching of 50 ohms. The patch units 131, 132, 133, and 134 include respective feeding ends 131*a*, 132*a*, 133*a*, and 134*a* connected to the respective branch lines 141, 142, 144, and 145. A distance D between two adjacent feeding ends is between 0.5 to 0.7 wavelength of the frequency band, for example, 0.6 wavelength, 7.48 mm, and may meet the impedance matching of 80 ohms. In addition, the lengths of the branch lines 141, 142, 144, and 145 may also meet the impedance matching of 80 ohms.

Moreover, the antenna module 100 further includes fourth impedance transformers 147 and 148 disposed at the intersections of the main line 143 and the branch lines 141, 142, 144, and 145 (the positions A2 and A3) to match the impedance.

Figure 2:
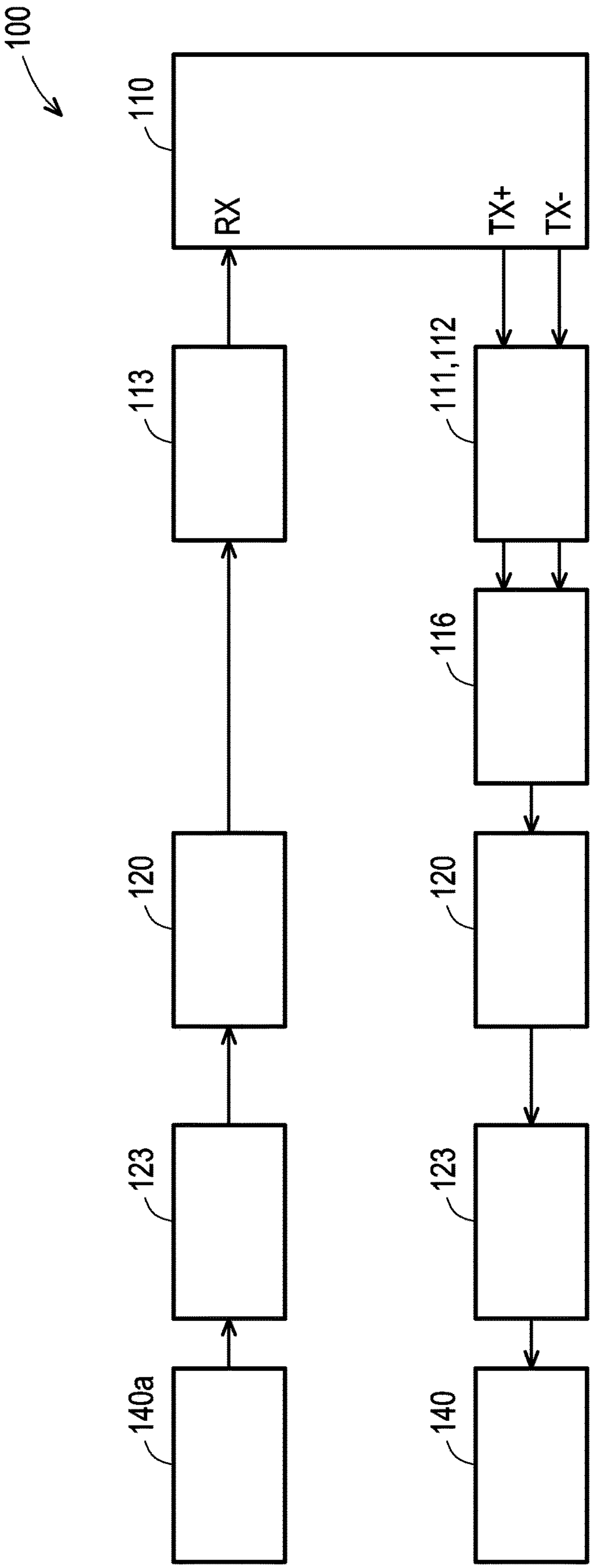
FIG. 2 is a block diagram of the antenna module of FIG. 1.

FIG. 2 is a block diagram of the antenna module of FIG. 1. Please refer to FIG. 2. FIG. 2 shows the antenna module 100 when signals are received and transmitted. The signals received by the receiving array antenna 140*a* are transmitted to the transceiver chip 110 via the capacitors 123, the bandpass filters 120, and the third impedance transformer 113. The signals from the transceiver chip 110 are transmitted to the transmitting array antenna 140 via the first impedance transformer 111 and the second impedance transformer 112, the power divider 116, the bandpass filters 120, and the capacitors 123.

The transmitting array antenna 140 and the receiving array antenna 140*a* may operate synchronously. The antenna module 100 may detect the speed and the distance (scalar) of an object approaching or moving away with 1 transmit 1 receive (1T1R). When the antenna module 100 is operated with 1 transmit 2 receive (1T2R), it may be used to detect the features of objects in different orientations (i.e., vectors on a 2D plane).

It is worth mentioning that the antenna structure for 24 GHz radar detection currently on the market is configured on two independent circuit boards, and then the signals from the two circuit boards that are disposed one above another are connected in series. The antenna module 100 of the present embodiment is located on the same layer on the circuit board.

Figure 3:
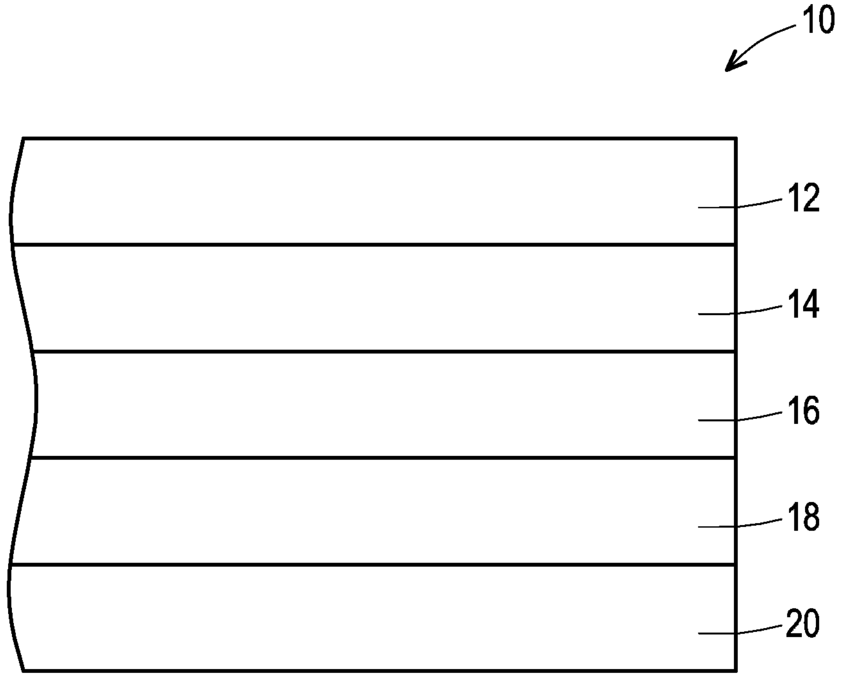
FIG. 3 is a schematic cross-sectional view of a circuit board with the antenna module of FIG. 1.

FIG. 3 is a schematic cross-sectional view of a circuit board with the antenna module of FIG. 1. Referring to FIG. 3, in the present embodiment, the circuit board 10 where the antenna module 100 is disposed includes, for example, a special board 12 (Ro4350B board) uppermost, the antenna module 100 (the transmitting array antenna 140, the receiving array antenna 140*a*, and a microstrip passive circuit disposed on the upper surface of the special board 12), and then four layers of regular boards 14, 16, 18, 20 (FR4 board) below. The special board 12 is pressed with the regular boards 14, 16, 18, and 20, so that there is no gap between the special plate 12 and the regular board 14. Such a design enables the antenna module 100 to have good quality for 24 GHz at both the transmitting end and the receiving end, and compared with conventional design, the structure of the present embodiment has the advantage of cost saving.

Figure 4:
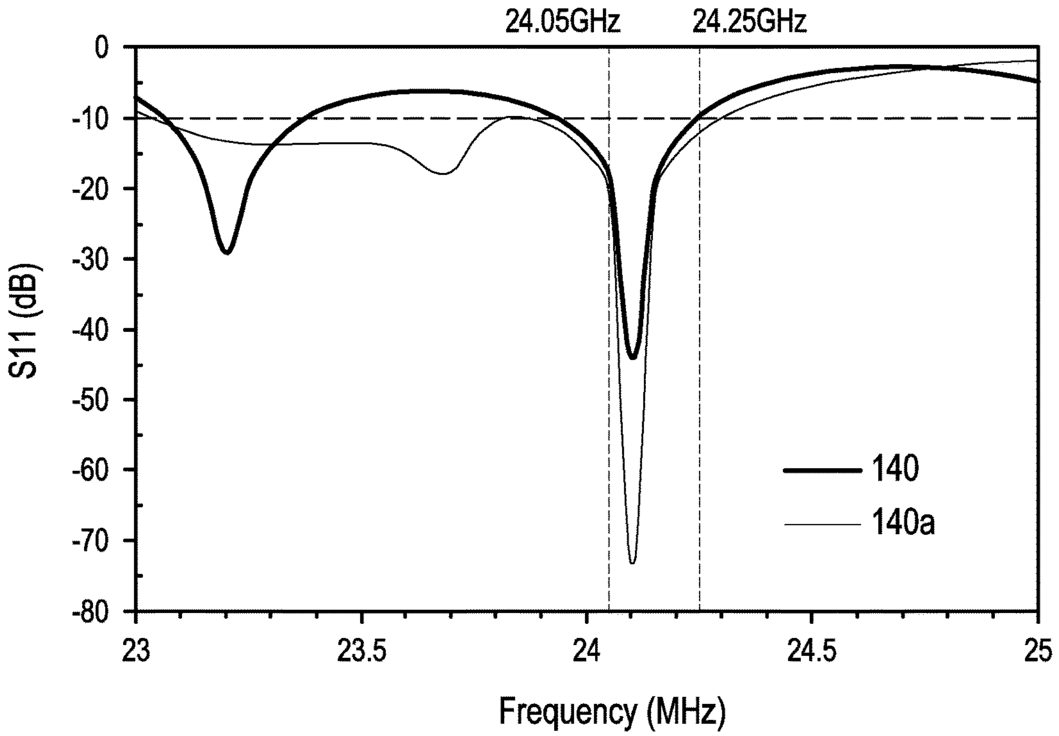
FIG. 4 is a plot diagram of frequency vs. reflection loss (S11) of the antenna module of FIG. 1.

FIG. 4 is a plot diagram of frequency vs. return loss (S11) of the antenna module of FIG. 1. Referring to FIG. 4, in the present embodiment, the return loss of the transmitting array antenna 140 and the receiving array antenna 140*a* in the range of 24.05 GHz to 24.25 GHz may be at −10 dB or less, therefore achieving good performance.

Figure 5:
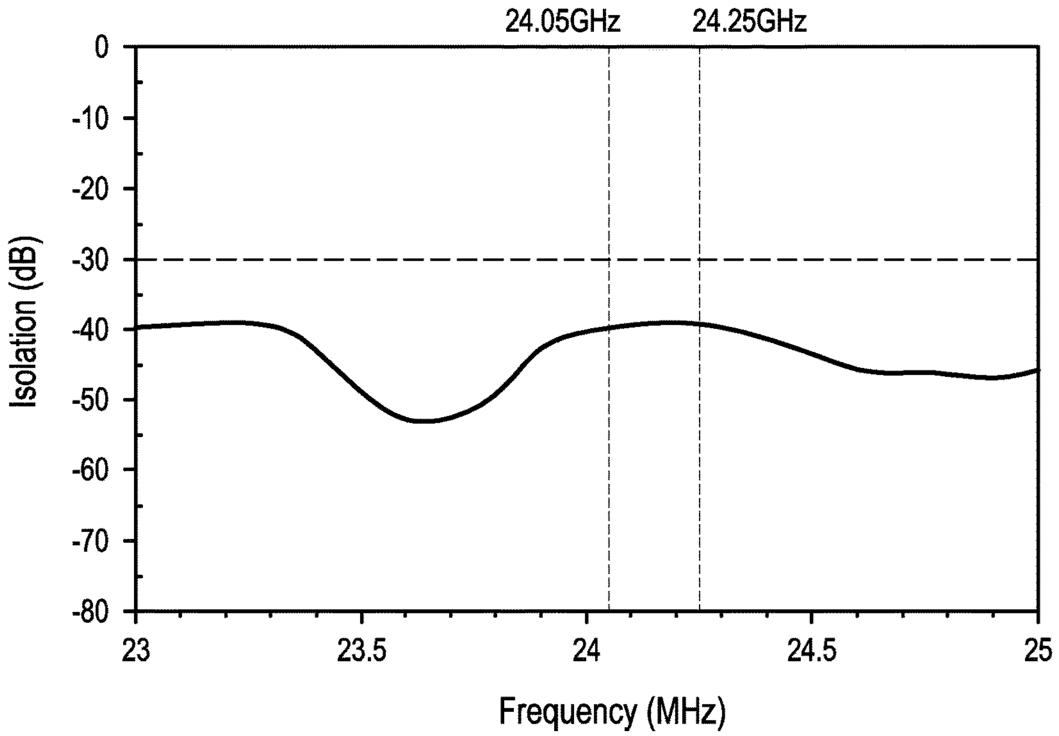
FIG. 5 is a plot diagram of frequency vs. isolation of the antenna module of FIG. 1.

FIG. 5 is a plot diagram of frequency vs. isolation of the antenna module of FIG. 1. Referring to FIG. 4, in the present embodiment, the distance L1 (FIG. 1) between the transmitting array antenna 140 and the receiving array antenna 140*a* is 30 mm, the isolation is −30 dB or less, and therefore the performance is good.

Figure 6:
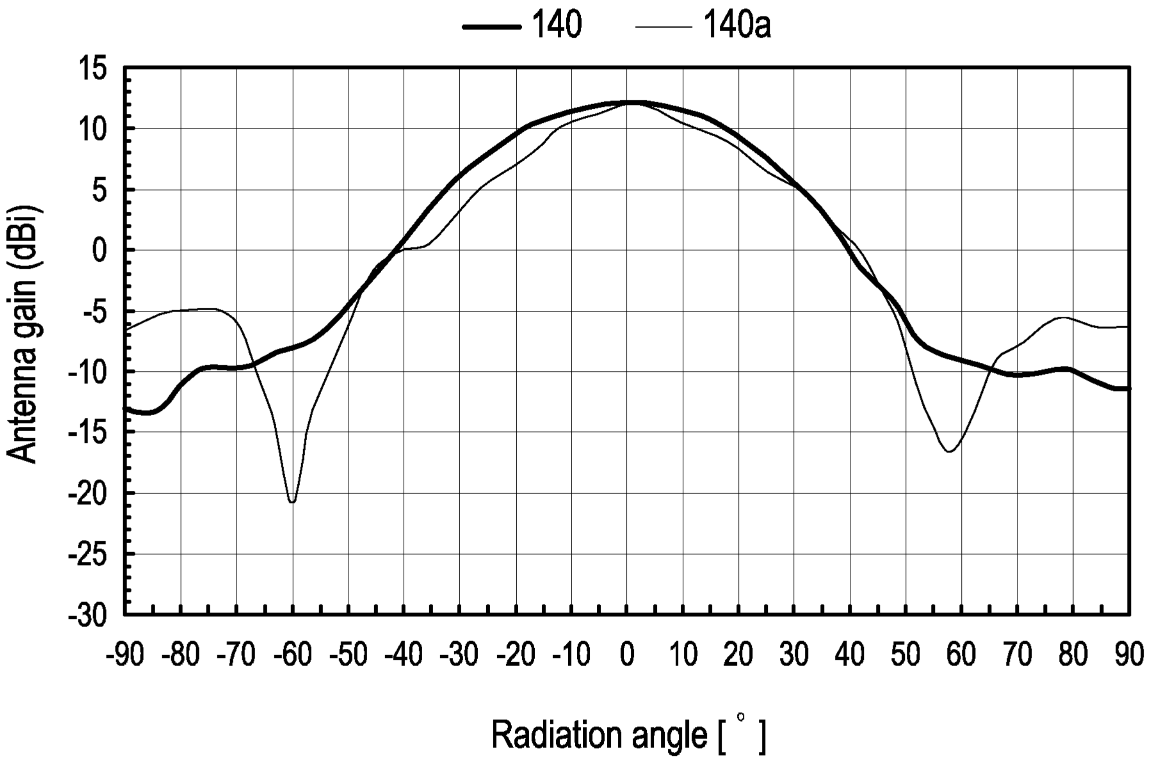
FIG. 6 is a plot diagram of radiation angle vs. antenna gain of the antenna module of FIG. 1.

FIG. 6 is a plot diagram of radiation angle vs. antenna gain of the antenna module of FIG. 1. Referring to FIG. 6, in the present embodiment, the radiation angles of the main beams of the transmitting array antenna 140 and the receiving array antenna 140*a* may both be greater than 0 dBi from −40 degrees to +40 degrees, which achieves good performance.

Based on the above, the transmitting array antenna and the receiving array antenna of the antenna module of the disclosure are symmetrically arranged at two opposite sides of the transceiver chip, and the design of separating the transmitting array antenna and the receiving array antenna may improve antenna efficiency. In addition, a bandpass filter is provided between the transceiver chip and the transmitting array antenna, and another bandpass filter is provided between the transceiver chip and the receiving array antenna. The installation of the bandpass filters may prevent the electromagnetic interference (EMI) on the transmitting array antenna, and the bandpass filters filter out unwanted frequencies for the receiving array antenna. Moreover, a capacitor is provided between the transmitting array antenna and the corresponding bandpass filter, and another capacitor is provided between the receiving array antenna and the corresponding bandpass filter. This design avoids electrostatic discharge (ESD), preventing excessive static electricity from damaging the transceiver chip. Furthermore, the antenna module of the disclosure has better impedance matching with the above design.

What is claimed is:

1. An antenna module, comprising:

a transceiver chip;

a transmitting array antenna;

a receiving array antenna, the transmitting array antenna and the receiving array antenna being symmetrically disposed at two opposite sides of the transceiver chip;

two bandpass filters, one of the two bandpass filters being disposed between the transceiver chip and the transmitting array antenna and connected to the transceiver chip and the transmitting array antenna, and the other bandpass filter being disposed between the transceiver chip and the receiving array antenna and connected to the transceiver chip and the receiving array antenna; and two capacitors, one of the two capacitors being disposed between the transmitting array antenna and the corresponding bandpass filter and connected to the transmitting array antenna and the corresponding bandpass filter, and the other capacitor being disposed between the receiving array antenna and the corresponding bandpass filter and connected to the receiving array antenna and the corresponding bandpass filter.

2. The antenna module of claim 1, further comprising a power divider disposed between the transceiver chip and the bandpass filter corresponding to the transmitting array antenna, and connected to the transceiver chip and the corresponding bandpass filter.

3. The antenna module of claim 2, further comprising a first impedance transformer, a second impedance transformer, a first microstrip, and a second microstrip, wherein the first impedance transformer, the second impedance transformer, the first microstrip, and the second microstrip are disposed between the transceiver chip and the power divider; the first impedance transformer is connected to the transceiver chip; the first microstrip is connected to the first impedance transformer and the power divider; the second impedance transformer is connected to the transceiver chip; the second microstrip is connected to the second impedance transformer and the power divider; and a length of the first microstrip is different from a length of the second microstrip.

4. The antenna module of claim 1, further comprising a third impedance transformer and a third microstrip, wherein the third impedance transformer and the third microstrip are disposed between the transceiver chip and the bandpass filter corresponding to the receiving array antenna, the third impedance transformer is connected to the transceiver chip, and the third microstrip is connected to the third impedance transformer and the corresponding bandpass filter.

5. The antenna module of claim 1, further comprising two transmission lines, wherein one of the two transmission lines is connected to the transmitting array antenna and the corresponding bandpass filter, the other transmission line is connected to the receiving array antenna and the corresponding bandpass filter, the two capacitors are connected to the two respective transmission lines, each of the capacitors comprises a first line segment connected to the corresponding transmission line, the antenna module resonates at a frequency band, and a length of the first line segment is ¼ wavelength of the frequency band.

6. The antenna module of claim 5, wherein each of the capacitors further comprises a second line segment connected to the first line segment, and a length of the second line segment is ¼ wavelength of the frequency band.

7. The antenna module of claim 5, wherein each of the capacitors further comprises a sector-shaped block connected to the first line segment.

8. The antenna module of claim 1, wherein each of the transmitting array antenna and the receiving array antenna comprises a main line, a plurality of symmetric branch lines extending from the main line, and a plurality of patch units connected to the branch lines, the patch units are arranged in a form of an array, the antenna module resonates at a frequency band, and a length of the main line is a wavelength of the frequency band.

9. The antenna module of claim 8, wherein the patch units comprise feeding ends connected to the branch lines, and a distance between two adjacent feeding ends is between 0.5 to 0.7 wavelength of the frequency band.

10. The antenna module of claim 8, further comprising a plurality of fourth impedance transformers disposed at intersections of the main line and the branch lines.

* * * * *